J. W. CHAMBERS.
Assignor to A. R. BLACKLOCK.
Fan Attachments for Sewing-Machines.
No. 8,792. Reissued July 8, 1879.
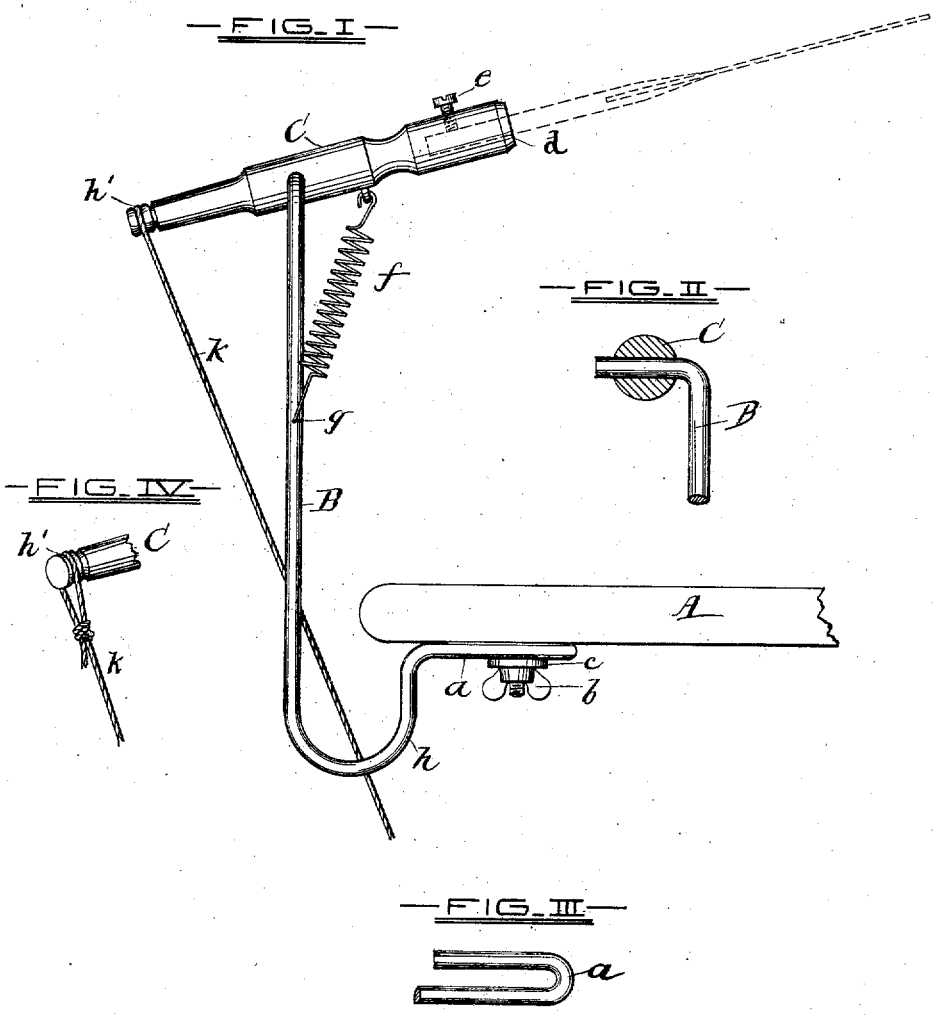
WITNESSES.
J. E. Carpenter
W. T. Hutchinson
INVENTOR.
James Wright Chambers,
by G. H. W. T. Wood,
Atty.
N. PETERS, PHOTO-LITHOGRAPHER, WASHINGTON, D. C.

UNITED STATES PATENT OFFICE.

JAMES WRIGHT CHAMBERS, OF BALTIMORE, MARYLAND, ASSIGNOR TO ALLAN RAMSAY BLACKLOCK, OF SAME PLACE.

IMPROVEMENT IN FAN ATTACHMENTS FOR SEWING-MACHINES.

Specification forming part of Letters Patent No. 210,296, dated November 26, 1878; Reissue No. 8,792, dated July 8, 1879; application filed May 27, 1879.

*To all whom it may concern:*

Be it known that I, JAMES WRIGHT CHAMBERS, of Baltimore city, State of Maryland, have invented a new and Improved Fan Attachment for Sewing-Machines; and I do hereby declare that the following is a full, clear, and exact description of the same, reference being had to the accompanying drawings, forming part of this specification.

My invention is an improvement upon that form of fan designed to be applied to a sewing-machine, in which a standard is clamped to the table, and a socket to receive the fan-handle is pivoted to the standard, and is vibrated by the conjoint and alternate action of a spiral spring and a flexible cord attached to some of the driving parts of the machine.

My invention consists, first, in the construction of the standard, which is formed of a rod bent at its lower end to adapt it to be adjustably secured under the sewing-machine table by means of a thumb-screw, which rod is further bent downward and outward from said lower end to clear the molding usually found under a sewing-machine table, and also to admit of the adjustment of the standard toward and from said table, whereby the operator on the machine may be enabled to change the position of the fan to a limited yet convenient extent. The vertical part of said standard is, at the point of its connection with the fan-lever, bent to a right angle, thus forming a simple bearing or fulcrum, upon which the fan-lever may be slipped, and from which it may be detached at pleasure. The said standard is perforated somewhere near the center of its length to receive the lower end of the spiral spring before referred to, this provision greatly simplifying and cheapening the construction of the device.

The invention consists, secondly, in the combination, with said standard, of a fan-lever perforated to receive the aforementioned fulcrum end of the standard, and also provided with a socket and set-screw to receive and secure the fan-handle, and also with a beaded or annularly-grooved end to receive a loop formed at the upper extremity of the operating-cord leading from one of the driving parts of the machine, which construction admits of the ready attachment and detachment of the cord to and from the fan-lever.

The invention consists, thirdly, in combining with the standard, fan-lever, and spring a cord having means of adjustable attachment to the outer end of said lever, the attaching end of said cord being kept in position upon the lever by the tension of the spring operating at the opposite side of the fulcrum of the lever.

The invention consists, lastly, in other combinations of various parts of the device, as hereinafter particularly specified.

In the annexed drawings, Figure 1 is a side elevation of the invention. Fig. 2 is a cross-section of the fan-lever, showing its connection with and support by the standard. Fig. 3 is a view showing the shape of the part of the standard which attaches to the sewing-machine table. Fig. 4 is a perspective view of the end of the fan-lever to which the cord is attached.

Similar letters of reference indicate similar parts in all the views.

A represents the table of the machine, and B the bent metal standard, which is suitably finished by plating, japanning, or polishing. One end of the standard is bent at *a* to form a flat bearing or horizontal hook, which rests against the under side of the table, and at which end it is secured to the table by a thumb-screw, *b*, passing through the hook, and having a collar, *c*, that binds against the same to hold it firmly. This standard extends from its point of attachment horizontally a short distance, is then bent down at *h*, and then up again into a vertical position. The upper end of this standard is bent at a right angle, so as to form a bearing or fulcrum for the fan-lever C, passing through a hole in the same, as shown particularly in Fig. 2.

The fan-lever is turned and polished, being made of wood, and provided at the end which when the device is in position is nearest the operator with a socket, *d*, to receive the handle of an ordinary fan.

A set-screw, *e*, serves to hold the fan-handle securely in the socket. Between the said end of the fan-lever and the standard is attached the upper end of the spiral spring *f*, the lower end of which is attached to the standard B by means of a perforation, *g*, therein. Upon the other end of the fan-lever is formed a beading, *h'*, into the groove or depression of which beading is placed the looped end of the cord *k*, which cord extends down to the treadle or any of the driving parts of the machine.

The simple mode of attachment of the fan-lever to the standard and of the cord to the fan-lever admits of the ready detachment and separation of said parts, which may be said also of the attachment of the spiral spring, fan-lever, and standard.

By bending the standard B to a right angle at its upper end it will be seen that a pivot or axis is formed, upon which the fan-lever may work smoothly without noise, and from which the said lever may be quickly slipped by a lateral movement when, as is often the case, it is desired to separate the parts.

The mode of attachment to the table does not scar the upper surface thereof, and the bend *h*, in addition to providing space for the forward or backward adjustment of the standard, will, as before stated, clear the marginal molding usually found under a sewing-machine table.

It will be seen that as the machinery is driven the alternate action of the cord and spring causes the lever and the attached fan to be reciprocated, so as to create a constant current of fresh air for the operator.

In making use of my invention, it may be applied to any kind of a machine; and instead of using it for refreshing the operator, it may be employed in scroll-saws for blowing the sawdust away.

I am aware of the fact that a standard has been applied to a sewing-machine table for a similar purpose by a clamp having a pair of jaws, one of which jaws extends over the top and the other under the bottom edge of the table. This construction, however, scars the polished upper surface of the table, and cannot be applied to advantage if, as is frequently the case, there should be any molding along the margin upon the under side of the table.

In attaching the fan-lever C, also, I am aware that the standard has been bifurcated and a lever with a socket fastened therein by a separate bolt or rivet. This not only does not permit the easy and quick removal of the fanning device from the standard, but the several parts wear, and produce much rattle and noise.

Having thus described my invention, what I claim as new, and wish to secure by Letters Patent of the United States, is—

1. The standard having the horizontal hook *a*, the curvature *h*, and vertical extension B, provided with a horizontal bend, serving as the fulcrum for the fan-lever, substantially as specified.

2. The combination of the standard having the horizontal hook or flat bearing *a* with the thumb-screw and binding-collar, substantially as specified.

3. The standard having its upper end bent horizontally to form a fulcrum for the fan-lever, combined with said lever, laterally perforated to receive said horizontal end of the standard, substantially as set forth.

4. The combination, with the standard, fan-lever, and spring, of a cord adapted to be adjustably attached to the outer end of said lever, substantially as and for the purpose specified.

5. The standard made of a rod bent of one piece into a horizontal portion, *a*, for attachment to the under side of a table, and having a dipping or downward bend, *h*, in combination with the fan-lever, the spring *f*, and cord *k*, substantially as and for the purpose set forth.

6. The standard made in one piece, with a right-angled bend at its upper end, in combination with a laterally-perforated fan-lever resting directly on said bend, together with the spring and pulling-cord arranged in relation to a driving part of a machine, substantially as and for the purposes set forth.

7. The standard B, having the perforation *g*, combined with the fan-lever C and the spring *f*, having its lower end inserted in the perforation *g* of the standard, and the other end united with said fan-lever, as specified.

In testimony whereof I have hereunto subscribed my name this 24th day of May, A. D. 1879.

JAMES WRIGHT CHAMBERS.

Witnesses:

THOS. MURDOCH,

WM. C. NICHOLLS.